(12) United States Patent
Knee

(10) Patent No.: US 9,401,010 B2
(45) Date of Patent: Jul. 26, 2016

(54) ENHANCING PERCEIVED SHARPNESS OF IMAGES

(71) Applicant: Snell Limited, Reading, Berkshire (GB)

(72) Inventor: Michael James Knee, Petersfield (GB)

(73) Assignee: Snell Limited, Reading, Berkshire (GB)

( * ) Notice: Subject to any disclaimer, the term of this patent is extended or adjusted under 35 U.S.C. 154(b) by 118 days.

(21) Appl. No.: 14/328,459

(22) Filed: Jul. 10, 2014

(65) Prior Publication Data
US 2015/0016743 A1  Jan. 15, 2015

(30) Foreign Application Priority Data

Jul. 11, 2013 (GB) .................... 1312440.9

(51) Int. Cl.
 G06K 9/00 (2006.01)
 G06T 5/00 (2006.01)
(52) U.S. Cl.
 CPC ...................... G06T 5/003 (2013.01)
(58) Field of Classification Search
 None
 See application file for complete search history.

(56) References Cited

U.S. PATENT DOCUMENTS

| 6,408,109 | B1 * | 6/2002 | Silver ............... G06T 7/0083 382/190 |
| 6,766,068 | B2 * | 7/2004 | Aoyama ............. G06T 3/403 358/2.1 |
| 6,832,009 | B1 | 12/2004 | Shezaf et al. |
| 7,477,804 | B2 * | 1/2009 | Chung ............... G06T 3/403 345/606 |
| 2003/0228064 | A1 | 12/2003 | Gindele et al. |

OTHER PUBLICATIONS

S. Yashuda et al "25-v inch 114-degree Trinitron color picture tube and associated new developments", IEEE BTR-20, Issue 3, Aug. 1974, pp. 193-200.
United Kingdom Patent Application No. GB 1312440.9 Search Report, dated Jan. 31, 2014 (1 page).

* cited by examiner

*Primary Examiner* — Eueng-Nan Yeh
(74) *Attorney, Agent, or Firm* — Michael Best & Friedrich LLP

(57) ABSTRACT

A method of enhancing the perceived sharpness of an image by controlling a spatial interpolation process. A pixel value spatial gradient measure is formed and used to generate a map of modified pixel positions. In this map, the pixel spacing is reduced when the gradient measure is high. By using this map of modified pixel positions to control an otherwise conventional interpolation process, an output image is formed having a perceived sharpness which is greater than that of the unmodified output of the interpolation process.

20 Claims, 6 Drawing Sheets

ENHANCING PERCEIVED SHARPNESS OF IMAGES

FIELD OF INVENTION

This invention concerns sharpness enhancement of images and video sequences.

BACKGROUND OF THE INVENTION

This invention concerns the enhancement of the perceived sharpness of sampled images and video sequences. The invention is particularly suitable for images that have been upconverted from lower resolutions, for images that are defocused and for moving video sequences that are blurred by camera integration.

Images and video sequences are today being captured on devices with a very wide range of resolutions, from a few hundred pixels wide in the case of inexpensive mobile phones, to professional cameras whose resolution in some cases approaches 10,000 pixels wide. Likewise, the resolution of display devices covers a similar range. There is therefore an increasing need to convert between different resolutions, a process that is often referred to as "resizing" in image processing software. Resizing may be classified into two types: downconversion, where the sampling resolution of the output is lower than that of the input, and upconversion, where the sampling resolution of the output is higher than that of the input. Downconversion can usually be accomplished at high quality with a linear filtering operation that ensures that the picture signal meets the Nyquist limit of the new sampling frequency, so that aliasing is avoided. With upconversion, there are two broad approaches. One is to upconvert by repeating input pixels over rectangular blocks of output pictures. This gives a perception of sharpness, but a generally unacceptable overall degradation due to the visibility of the block structure. The other approach is to apply a linear interpolation filter which suppresses frequencies beyond the bandwidth of the input sampling structure. This gives a subjectively smooth and artefact-free output picture, but the problem, especially when comparing with pictures that were created at a higher resolution, is the subjective impression of "softness". There has for a long time been an interest in enhancing upconverted images to increase their subjective sharpness without introducing the artefacts that arise from sample-repeat upconversion.

Other applications for image enhancement to increase sharpness are defocused pictures, and moving video sequences that are blurred by camera integration. In these cases, the sampling structure can support the portrayal of sharper edges, but the high-frequency signals responsible for subjective sharpness have been attenuated or suppressed. Again, there is interest in enhancing the subjective sharpness of such images.

One method of enhancement has been applied to analogue cathode-ray-tube video displays. For example, S. Yashuda et al in "25-v inch 114-degree Trinitron color picture tube and associated new developments", IEEE BTR-20, Issue 3, August 1974, pp 193-200, describe a method of beam scan velocity modulation, in which horizontal transitions are sharpened by varying the scan velocity during the transition. Referring to FIG. 1, a video signal (101) is differentiated to obtain a derivative signal (102) which is used to control the beam scan velocity, leading to a variation of the position (103) of the deflected scanning spot from its usual linear ramp characteristic. The effect of this variation on a white window pattern (104) is shown (105) as a narrowing of the pattern.

This method underwent several improvements, including the development of versions suitable for digital processing. However, the method is only applicable to horizontal enhancement in beam-scanning displays, which are now largely obsolete.

Another, more generally applicable, method of enhancement involves linear filtering to amplify or "boost" high spatial frequencies. This can be performed as a separate operation or, in the case of upconversion, by modifying the upconversion filter so that the response at higher frequencies is increased. Linear filtering can be effective in the cases of defocusing or motion blur, where high frequencies may be present in the picture but have been attenuated by the defocused lens or by camera integration. The filter can reverse the effect of that attenuation and restore the lost sharpness of the picture. In the case of linear upconversion, there is no benefit in boosting the highest frequencies of the output picture because no signals are present at those frequencies. However, subjective sharpness can sometimes be increased by boosting the highest input frequencies either before or after upconversion.

Linear filtering has various disadvantages. One disadvantage is that noise on the input picture can be amplified. This is because noise generally makes a greater relative contribution to the higher frequency signals, and can therefore be disproportionately amplified. Another disadvantage is that high-pass filtering can increase the dynamic range of the signal, leading to the possibility of clipping and, ironically, consequential loss of detail. An example of this is given in FIG. 2, in which a linear filter is applied to a rising and a falling edge in the input video (201) which has the effect of steepening the transition but which also leads to overshoots in the output signal (202).

SUMMARY OF THE INVENTION

The inventor has recognised that the principle of scan velocity modulation can be applied horizontally and vertically to sampled signals regardless of the technology of the display. The invention works by generating a mapping by which each input sample is projected onto output space. The use of a mapping approach maintains the dynamic range of the input signal, avoiding problems of overshoots and of noise amplification, while increasing the subjective sharpness of picture detail.

The invention consists in a method and apparatus for enhancing the perceived sharpness of an image by reducing the spatial extent of a portrayed image feature in which data describing a point in an input image is used to compute data describing a different point in an enhanced output image according to a digitally-implemented spatial interpolation process controlled in dependence on a rectified pixel-value spatial gradient measure.

Advantageously, a sample-spacing parameter that controls the said spatial interpolation process is derived from a high-pass filtered pixel value spatial gradient function of the said input image.

In a preferred embodiment, a sequence of values of the said pixel value spatial gradient function for a sequence of adjacent pixels of the said input image are accumulated, prior to high-pass filtering.

Suitably, the said pixel value spatial gradient function is a combination of a horizontal pixel value gradient and a low-pass filtered version of said horizontal pixel value gradient.

In some embodiments the said pixel-value spatial gradient function is a combination of a vertical pixel value gradient and a low-pass filtered version of said vertical pixel value gradient.

In certain embodiments pixels are positioned according to a map comprising a sequence of pixel position values where the distance between each pixel and its preceding adjacent pixel is the sum of a fixed pixel-pitch value and the value of a high-pass filtered pixel value spatial gradient function.

In a preferred embodiment a map representing the positions of input image samples in an output image is inverted to form a map that represents the positions of output image samples in an input image before being used to control the spatial interpolation process.

Preferably, the map is corrected to ensure that it increases monotonically.

Suitably, maximum and minimum filters are applied to the map and the outputs of said filters are combined such that the resulting output is monotonically increasing.

BRIEF DESCRIPTION OF THE DRAWINGS

An example of the invention will now be described with reference to the drawings in which.

DETAILED DESCRIPTION OF THE INVENTION

A first image sharpness enhancement system according to the invention will now be described. All signals referred to in the following description are in normal raster scanning order, so that there is a direct correspondence between time and pixel position. Horizontal position increases by one pixel-pitch unit for every sample clock period; and, vertical position increased by one scan-line-pitch unit for every L sample clock periods, where L is the number of samples per scan line.

Figure 1:
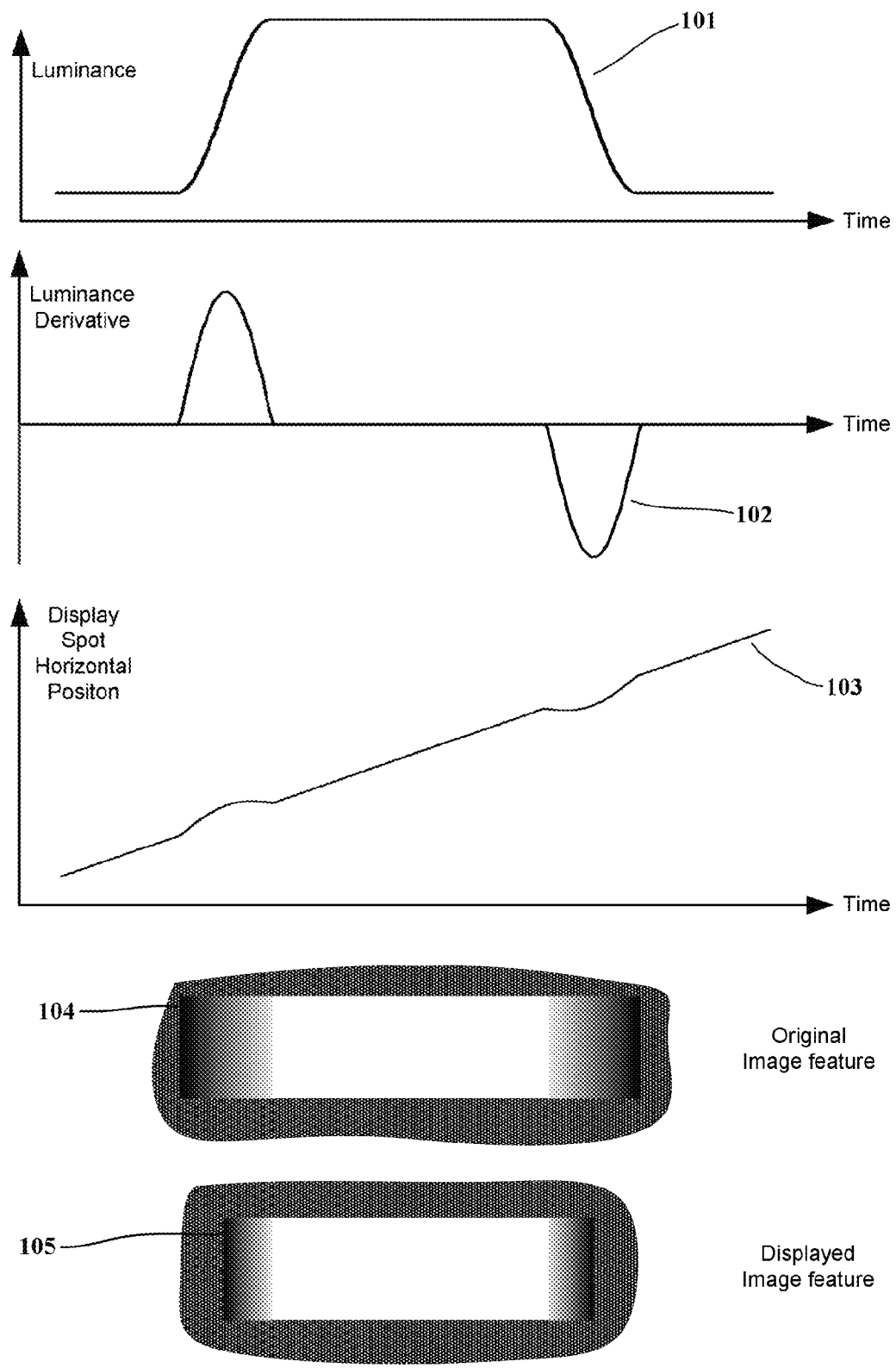
FIG. 1 illustrates the principle of scan velocity modulation in sharpening horizontal transitions according to prior art.
Figure 2:
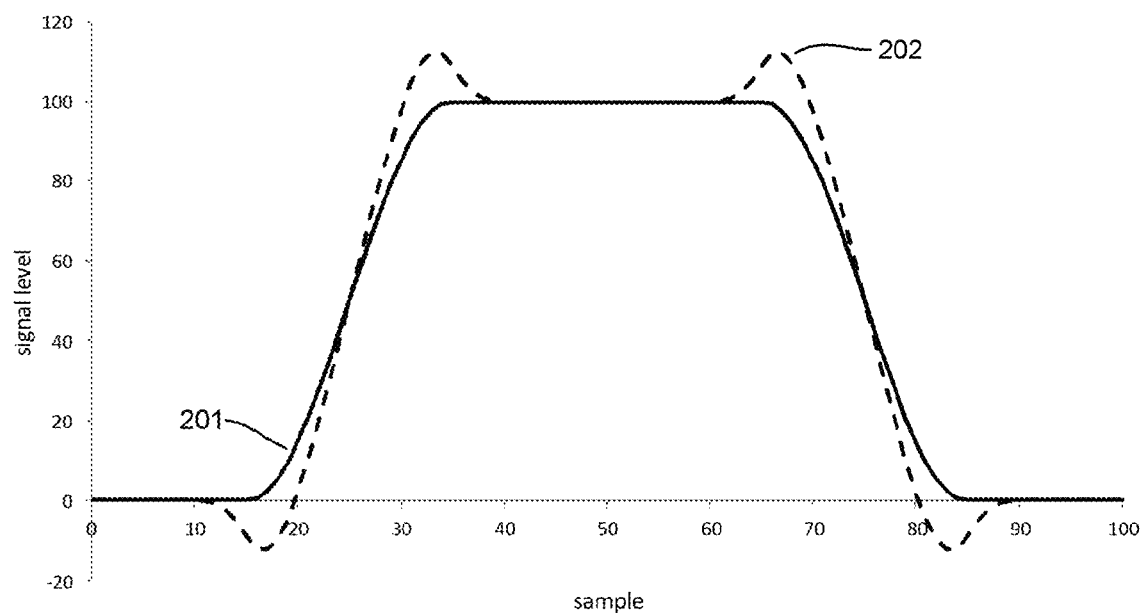
FIG. 2 is a graph illustrating the behaviour of a prior art linear enhancement filter.
Figure 3:
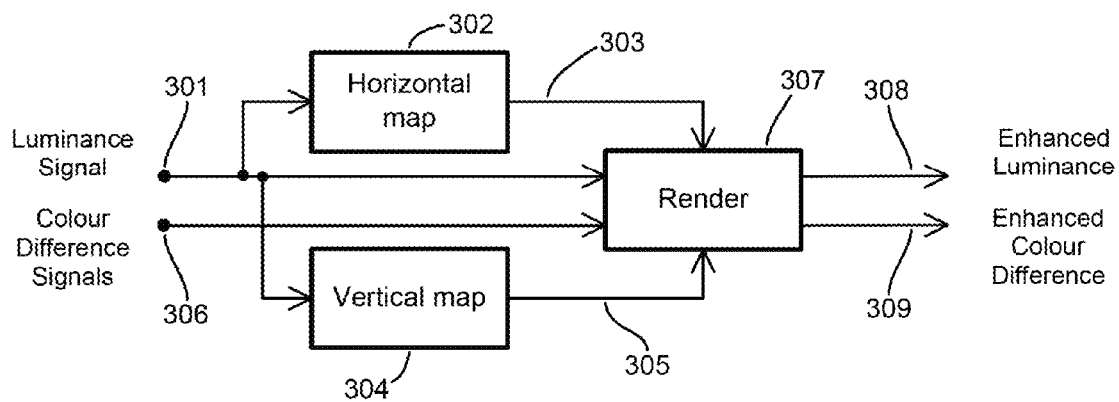
FIG. 3 is a top-level block diagram of a sharpness enhancement system according to the invention.

Referring to FIG. 3, an input video luminance signal (301) comprising a sequence of luminance values for the pixels of an input image is applied to a horizontal map circuit (302) to produce a horizontal map signal (303), and to a vertical map circuit (304) to produce a vertical map signal (305). These map signals represent respective sequences of pixel position values for horizontally and vertically adjacent pixels. The operation of these map circuits (302) and (304) will be described later with reference to FIG. 5. The input luminance signal (301), the accompanying input colour difference pixel values (306), and the horizontal and vertical map signals (303, 305) are applied to a known rendering engine (307) to produce enhanced output luminance and colour difference signals (308, 309). The pixel position values of the horizontal and vertical map signals (303, 305) provide sub-pixel-resolution horizontal and vertical spatial addresses, which are used by the rendering engine (307) to spatially interpolate the input signals (301, 306).

Figure 4:
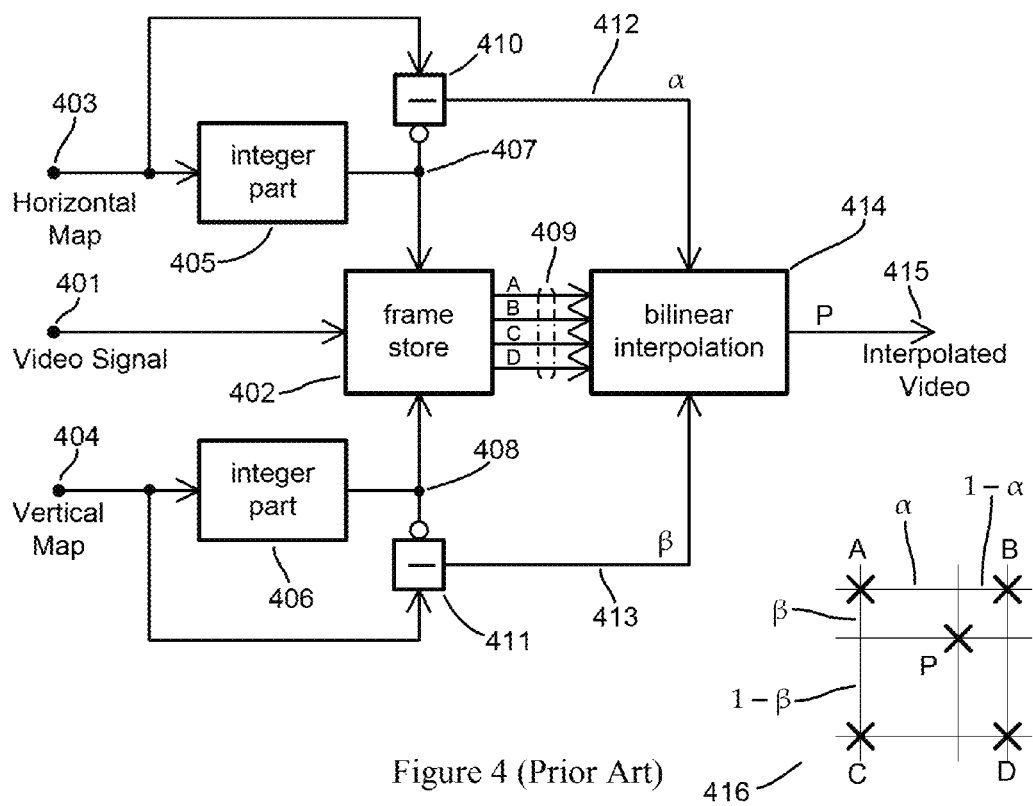
FIG. 4 is a detailed block diagram of a video rendering circuit according to prior art.

The operation of a suitable prior art rendering engine (307) will now be described in detail with reference to FIG. 4, in which, for convenience, only one component (luminance or one of the colour difference components) is shown. An input video signal (401) is written into a frame store (402). Incoming horizontal (403) and vertical (404) map signals are applied to circuits (405, 406) which calculate their integer parts (407, 408) and, by means of subtractors (410, 411), their fractional parts (412, 413) denoted $\alpha$ and $\beta$. The values of pixels denoted A, B, C and D (409) are read from the frame store (402) from locations given by the integer map values (407, 408). Sample A is addressed directly by those map values; associated samples B, C and D are in adjacent locations, as shown in the accompanying diagram (416).

The four samples, together with the fractional map values $\alpha$ and $\beta$ (412, 413) are then applied to a bilinear interpolation circuit (414) which calculates an interpolated sample value P (415) according to the following well-known formula:

$$P=(1-\alpha)(1-\beta)A+\alpha(1-\beta)B+(1-\alpha)\beta C+\alpha\beta D$$

This interpolation is a "read-side" rendering process because it reads input image samples from frame store locations determined by the map signals, which define output pixel positions that typically do not correspond to input pixel locations.

The operation of the inventive horizontal map circuit (302) will now be described in detail. The vertical map circuit (304) operates in a corresponding manner and follows the description of the horizontal map circuit (302) but with references to "horizontal" replaced by "vertical", single-sample delays replaced by line delays, and lines of pixels replaced by columns of pixels.

Figure 5:
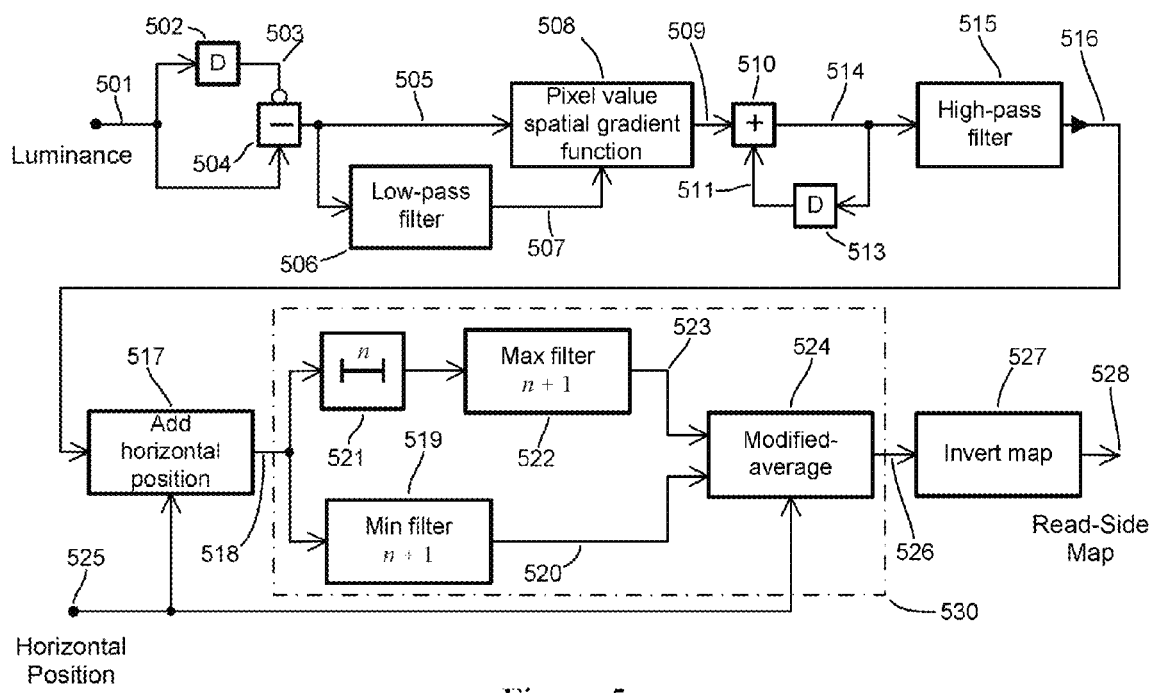
FIG. 5 is a detailed block diagram of the horizontal component of a sharpness enhancement system according to the invention.

With reference to FIG. 5, an input luminance signal comprising a sequence of pixel luminance values is applied to a single-sample delay (502) to produce a delayed luminance signal (503), which is subtracted (504) from the input luminance (501) to produce a horizontal gradient signal (505). The sign of the subtractor's output is ignored to obtain the absolute value of the gradient, so that the gradient signal (505) is a rectified gradient. This gradient signal is applied to a low-pass filter (506) whose output (507) is applied, along with the unfiltered gradient signal (505), to a pixel value spatial gradient function (508), whose output (509) will be used to produce a sample-spacing signal that controls the interpolation of output pixels.

A suitable low-pass filter (506) is a symmetric running-average filter of length (2n+1) samples, where n is approximately equal to the degree of sharpening required. That is to say horizontal transitions are narrowed by a factor of n.

The operation of the pixel value spatial gradient function (508) will now be described. A suitable function is $$\max\left\{0, 1 + \alpha\left(1 - \frac{g}{\max[g_{min}, \langle g \rangle]}\right)\right\}$$

where g is the (absolute) gradient (505), $g_{min}$ is a constant noise floor, $\langle g \rangle$ is the output (507) of the low-pass filter (506), and $\alpha$ is a constant gain factor. Suitable values of the constants are $\alpha=1$ and $g_{min}=4$ (in 8-bit luminance units).

The principle of the function is to replace the original input image sample pitch, which is represented by a value of 1, with a desired spacing which decreases as the local gradient (relative to nearby picture information) increases. The process operates at the input pixel rate and outputs a value for every input pixel that represents the desired distance of that pixel from its preceding pixel. In regions of high pixel-value gradient these distances will be less than the input pixel pitch, that is to say numeric values less than unity.

The output (509) from the pixel value spatial gradient function (508) is accumulated, at the input pixel rate, along each line of the picture. The accumulator consists of an adder (510) whose output (514) is delayed in a single-sample delay (513), and added to its current input.

The sequence of accumulated values at the adder output (514) is potentially a map defining the required horizontal position of each input pixel in the enhanced output image. However, at this stage it is not suitable for direct application as a mapping function, for two reasons:
  its value at the end of a line may not be close to the number of pixels per line, so that, when used to control a spatial interpolation process, it would bring about a net shrinkage or expansion of the line; and,
  it may contain significant low-frequency components, which would lead to undesirable large-scale horizontal shifts of picture information.

These problems are overcome by the action of subsequent processing as follows. First, the accumulated sample-spacing signal (514) is applied to a high-pass filter (515) to produce a sample-shift signal (516). A suitable filter is a high-pass filter 'complementary' to the low-pass filter (506); that is to say it has the response that would be obtained by subtracting the response of the filter (506) from unity.

The sample-shift signal (516) is added (517) to a horizontal position signal (525) to produce a map signal (518). The horizontal position signal (525) starts at zero on the first pixel of each input image line and increments by unity every pixel until it reaches the number of pixels per line L at the end of each input image line.

One potential problem remains with the map signal (518). It should be monotonically increasing, otherwise some picture information will end up being left-right reversed. The accumulation of the values of the pixel value spatial gradient function (509) prior to the high-pass filter (515) reduces the likelihood of negative-going transitions appearing at the filter output that would cause this problem. However, the actions of all the previous processing elements may occasionally lead to violation of the monotonicity constraint. The invention therefore contains a monotonicity correction process (530) whose operation will be described later with reference to FIG. 6.

The map signal (526), corrected by the monotonicity correction process (530) is a "write-side" map because it defines a, typically non-integer, output horizontal position for every input pixel. However, the known rendering circuit (307) in FIG. 3 requires a "read-side" map comprising a, typically non-integer, input position for every output pixel. The final action of the horizontal map generator (302) is therefore to apply the monotonicity-corrected, write-side map (526) to an inversion circuit (527) to produce a read-side map (528). Such inversion is well-known in the art and may, for example, be performed using an algorithm which identifies input pixels located adjacent to the required output pixel position and uses their values in a linear, or higher order, interpolation process to find the value of the output pixel.

The monotonicity correction process (530) operates as follows. The map signal (518) is applied to a minimum filter (519) whose output (520) is the minimum of the past (n+1) samples. It is also applied via an n-sample delay (521) to a maximum filter (522) whose output (523) is the maximum of its past (n+1) input samples. The outputs (520, 523) of the minimum and maximum filters (519, 522) are applied to a modified-average circuit (524) which computes the average of those two signals, modified by adding a very small fraction of the horizontal position (525). A suitable small fraction is 1/(100 N) where N is the picture width in samples. The modification ensures that the output is strictly increasing, which avoids problems of division by zero in subsequent processing stages.

Figure 6:
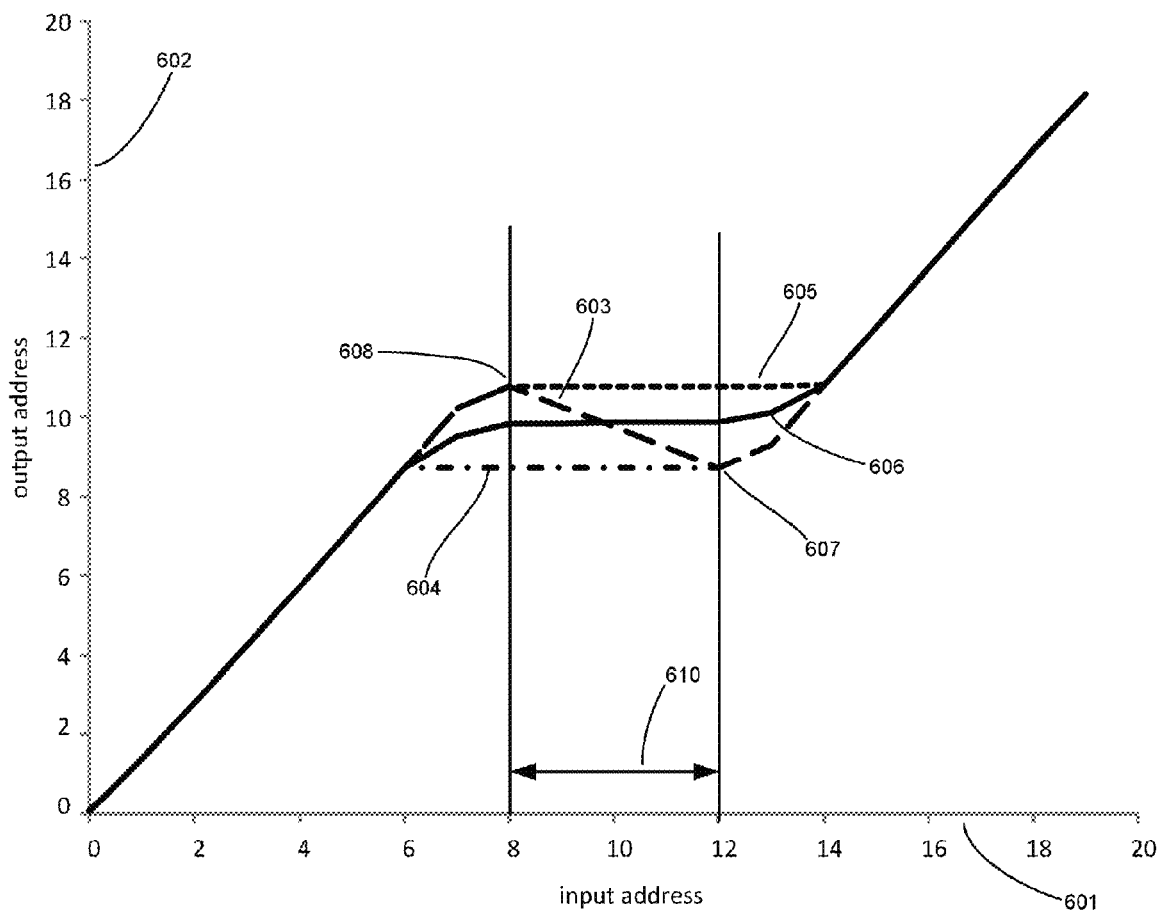
FIG. 6 is a graph illustrating the operation of a scan correction algorithm according to the invention.

Further explanation of the correction circuit (530) will now be given by way of an example, in which n=5, illustrated in the graphs of FIG. 6. The x-axis (601) represents input pixel locations or addresses, and the y-axis (602) represents write-side map address values. Four curves (603 to 606) are shown, which all coincide in the straight sections at input addresses 0 to 6 and 14 to 20. The long-dashed curve (603) shows the uncorrected map signal, corresponding to the input (518) to the correction process (530). To aid explanation, the other curves are all drawn with suitable delays so that the addresses they represent are co-timed and therefore co-located; they thus do not have the actual timing relationships that would occur in the system of FIG. 5.

The curves are drawn for a portion of a line containing a range (610) of input pixel values where the uncorrected address (603) is decreasing as the input address increases; this illustrates the problem that the correction circuit needs to solve.

The output (520) of the minimum filter applied to the uncorrected signal is shown as a dot-dashed line (604). The propagation delay of the process (530) is five samples and so the minimum filter effectively looks ahead by n=5 samples, thereby picking up the local minimum (607) at input address 12. Likewise, the output (523) of the maximum filter is shown as a dotted line (605). The input to the maximum filter (522) is delayed by five samples in the delay (521), therefore it looks back by n=5 samples, thereby picking up the local maximum (608) at input address 8. The modified average (526) of the minimum and maximum filter outputs is shown as the full line (606). Note that the addition of the fraction of the horizontal position value (525) ensures that the curve continues to rise slightly even though it is derived from the constant minimum value (607) and the constant maximum value (608). This modified output curve (606) is (qualitatively) as close as possible to the input curve (603), while meeting the monotonicity constraint.

Other correction methods to ensure monotonicity may be employed. One other method is to apply local scaling to the sample-shift signal (516) to ensure that it is always greater than −1 (so that it is monotonic after the horizontal position has been added).

Another method is to sort the map values (518) into ascending order. Finally, with careful choice of the parameters of the sample-spacing function (508), it may be possible to ensure that the monotonicity constraint is never violated in the first place, avoiding the need for a correction circuit. However, in the inventor's experience, the method given in the description above gives the best results.

Figure 7:
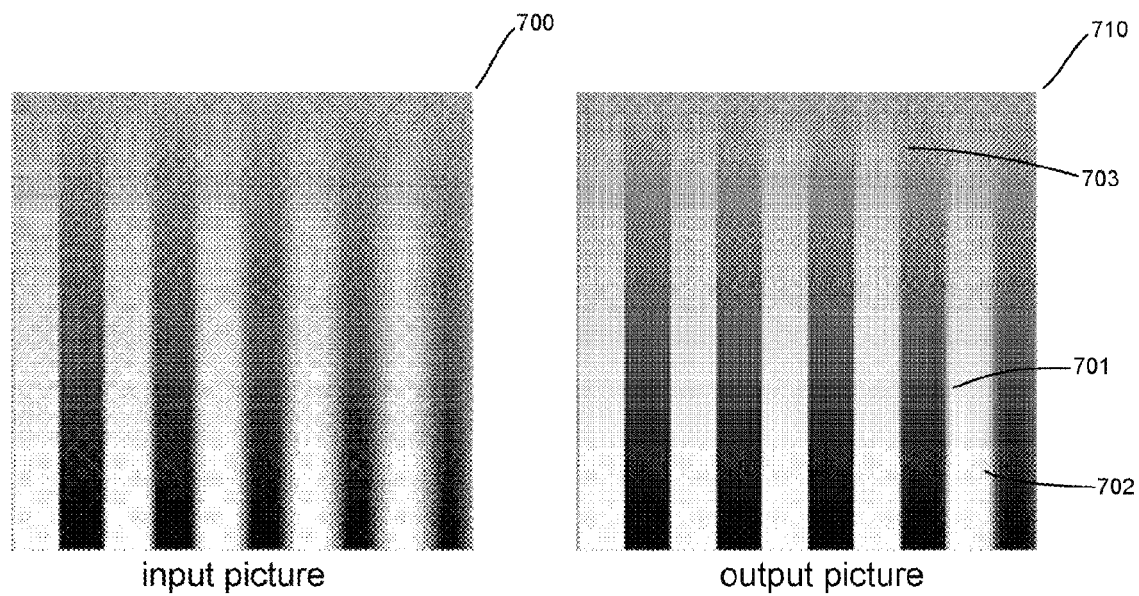
FIG. 7 illustrates the behaviour of the invention on a test pattern.

An example of the overall performance of the invention will now be given. Referring to FIG. 7, an input picture (700) is shown with increasing contrast from top to bottom and with decreasing sharpness from left to right. An output image (710) from processing according to an embodiment of the invention is shown, illustrating the substantial increase in sharpness of most of the picture, even (701) where the input picture is very blurred. The reasonable limitations of the algorithm are shown in regions of extreme blur (702) where some blur is still visible on the output, and in regions of very low contrast (703) where the noise floor $g_{min}$ comes into play.

The skilled person will recognise that variations to the design of the components of the invention are possible without departing from the scope of the invention. In the system of FIG. 3, the vertical map signal (303) and the horizontal map signal (305) would typically be derived from the luminance values of the pixels of the input image according to the processes illustrated in FIG. 5. Although two-dimensional enhancement of both luminance and colour difference signals is shown, other variations are possible. For example only luminance could be enhanced, or colour difference pixel value gradients could be used to determine mapping for colour difference pixels. Only horizontal enhancement, or only vertical enhancement could be applied. Luminance values could be used to derive map functions to be applied to RGB values.

The gradient may be measured by means other than a simple sample difference. Low-pass and high-pass filters need not be based on a simple running average. Other sample-spacing functions may be used. And, the map inversion function may involve interpolation techniques other than simple linear interpolation.

The above described steps of
high-pass filtering a rectified pixel-value gradient measure;
combining a directional (horizontal or vertical) pixel value gradient and a low-pass filtered version of the directional pixel value gradient;
accumulating a sequence of values of the pixel value spatial gradient function for a sequence of adjacent pixels of the input image;

are important steps which can be taken alone or in any combination to improve functionality. They are not however essential to the claimed invention.

The step of correcting a map to ensure that it increases monotonically may in some arrangements be unnecessary and—where it is necessary—techniques other than those specifically disclosed above may be used. Similarly, the step of inverting the map may not be required in all architectures.

The above description has been given in terms of streaming processes operating on samples in raster-scan order. However the processes of the invention can be carried out in other ways, including the processing of stored pixel values from files at speeds unrelated to the spatial or temporal sampling of an image or image sequence.

The invention claimed is:

1. An apparatus for enhancing the perceived sharpness of an image, the apparatus comprising:
a gradient measurer forming a pixel value spatial gradient function for an input image which has pixels at respective input pixel position values, where the distance between each pixel and its preceding adjacent pixel is a fixed pixel-pitch value;
a map generator for generating a map comprising a sequence of varied input pixel position values where the distance between each pixel and its preceding adjacent pixel is varied in accordance with said spatial gradient function; and
a spatial interpolator generating an output image from the input image by forming for a pixel of the output image at an output pixel location a weighted sum of pixel values in the input image;
wherein the weighted sum is formed with reference to said varied input pixel position values.

2. The apparatus according to claim 1 in which said gradient measurer comprises a high pass filter and generates a high-pass filtered pixel value spatial gradient function for the said input image.

3. The apparatus according to claim 1 in which said gradient measurer comprises an accumulator and a sequence of values of the said pixel value spatial gradient function for a sequence of adjacent pixels of the said input image are accumulated, prior to high-pass filtering.

4. The apparatus according to claim 1 in which said gradient measurer comprises a combiner and the said pixel value spatial gradient function is a combination of a directional (horizontal or vertical) pixel value gradient signal and a low-pass filtered version of said directional pixel value gradient signal.

5. The apparatus according to claim 1 in which, in the sequence of varied input pixel position values, the distance between each pixel and its preceding adjacent pixel is the sum of said fixed pixel-pitch value and the value of a high-pass filtered pixel value spatial gradient function.

6. The apparatus according to claim 1 in which said map is inverted to form a map that represents the positions of output image samples in an input image before being used in said spatial interpolation process.

7. The apparatus according to claim 1 in which the map is corrected to ensure that it increases monotonically.

8. The apparatus according to claim 7 in which maximum and minimum filters are applied to the map and the outputs of said filters are combined such that the resulting output is monotonically increasing.

9. A method of enhancing the perceived sharpness of an image, the method comprising:
receiving an input image defined by pixel values;
forming in a digital processor a rectified pixel value spatial gradient measure for said input image;
implementing in a digital processor a spatial interpolation process in which pixel values of the input image over a spatial extent of the input image are used to compute pixel values defining an output image; and
outputting said output image;
wherein said spatial extent is reduced in accordance with said rectified pixel value spatial gradient measure to enhance the perceived sharpness of said output image.

10. The method according to claim 9 in which a sample-spacing parameter controls said spatial interpolation process and said sample-spacing parameter is varied in accordance with said rectified pixel value spatial gradient measure.

11. The method according to claim 10 in which said rectified pixel value spatial gradient measure is high-pass filtered prior to varying of said sample-spacing parameter.

12. The method according to claim 11 in which a sequence of values of said rectified pixel value spatial gradient measure for a sequence of adjacent pixels of said input image are accumulated, prior to said high-pass filtering.

13. The method according to claim 9 in which said rectified pixel value spatial gradient measure is a combination of a horizontal pixel value gradient and a low-pass filtered version of said horizontal pixel value gradient.

14. The method according to claim 9 in which said rectified pixel value spatial gradient measure is a combination of a vertical pixel value gradient and a low-pass filtered version of said vertical pixel value gradient.

15. The method according to claim 9 in which said rectified pixel value spatial gradient measure is high-pass filtered and in which pixels are positioned according to a map comprising a sequence of pixel position values where the distance between each pixel and its preceding adjacent pixel is the sum of a fixed pixel-pitch value and the value of said high-pass filtered rectified pixel value spatial gradient measure.

16. The method according to claim 9 in which a map representing the positions of input image samples in an output image is inverted to form a map that represents the positions of output image samples in an input image before being used to control the spatial interpolation process.

17. The method according to claim 16 in which the map is corrected to ensure that it increases monotonically.

18. The method according to claim 16 in which maximum and minimum filters are applied to the map and the outputs of said filters are combined such that the resulting output is monotonically increasing.

19. A non-transitory computer-readable medium comprising instructions stored thereon adapted to cause programmable apparatus to implement a method of enhancing the perceived sharpness of an image, the method comprising:
- receiving an input image defined by pixels having pixel values and spaced at a fixed pixel pitch value;
- forming in a digital processor a rectified pixel value spatial gradient measure for said input image;
- forming a map comprising a sequence of pixel position values where the distance between adjacent pixels is the sum of the fixed pitch pixel pitch value and the value of said rectified pixel value spatial gradient function; and
- implementing in a digital processor a spatial interpolation process in which pixel values of the input image are used to compute pixel values defining an output image, said interpolation process being controlled by said map; and
- outputting said output image.

20. The method according to claim 19 in which a map representing the positions of input image samples in an output image is inverted to form a map that represents the positions of output image samples in an input image before being used to control the spatial interpolation process.

* * * * *